W. A. RIDDELL AND F. A. G. PIRWITZ.
PHOTOGRAPHIC SHUTTER.
APPLICATION FILED JAN. 17, 1919.
1,341,823.
Patented June 1, 1920.
8 SHEETS—SHEET 1.
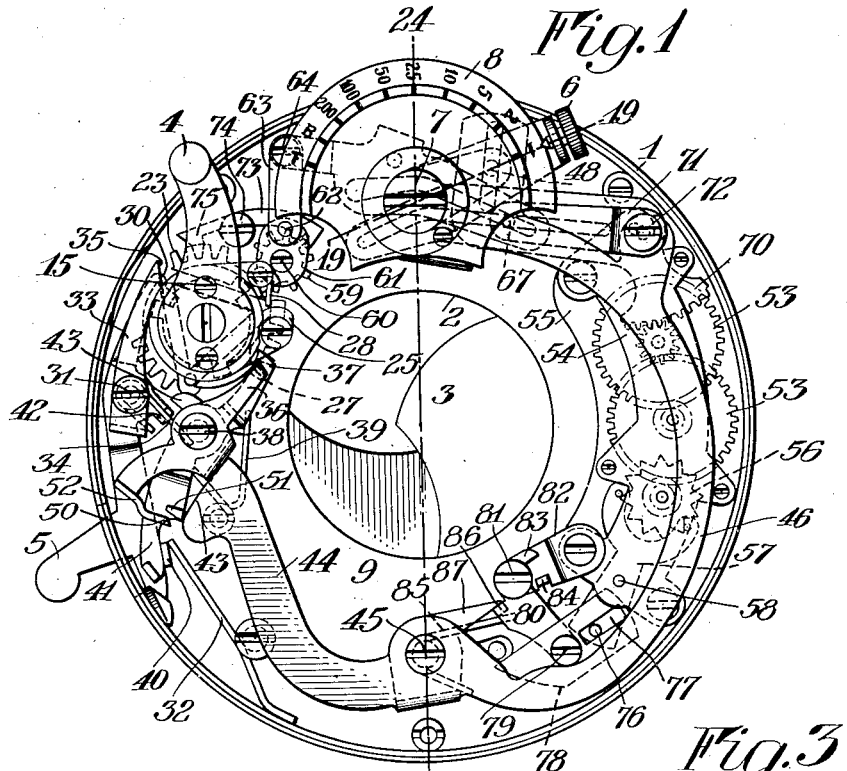
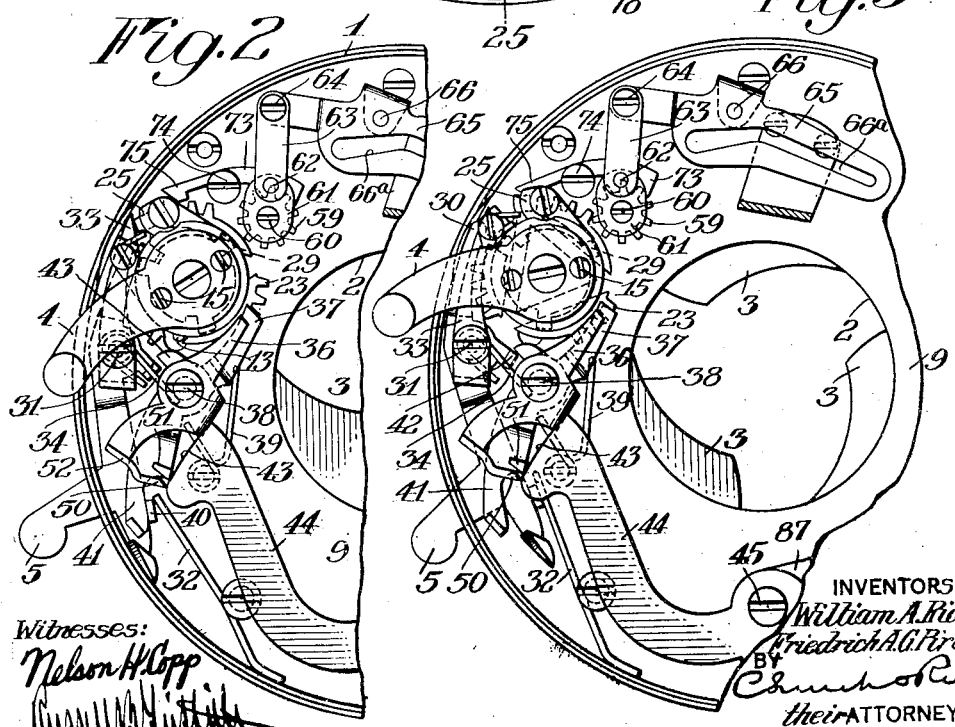
Witnesses:
Nelson H. Copp
INVENTORS
William A. Riddell
Friedrich A. G. Pirwitz
BY
their ATTORNEYS W. A. RIDDELL AND F. A. G. PIRWITZ.
PHOTOGRAPHIC SHUTTER.
APPLICATION FILED JAN. 17, 1919.

1,341,823.

Patented June 1, 1920.
8 SHEETS—SHEET 2.

Witnesses:
Nelson H. Copp

INVENTORS
William A. Riddell
Friedrich A. G. Pirwitz
BY Church Rich
their ATTORNEYS

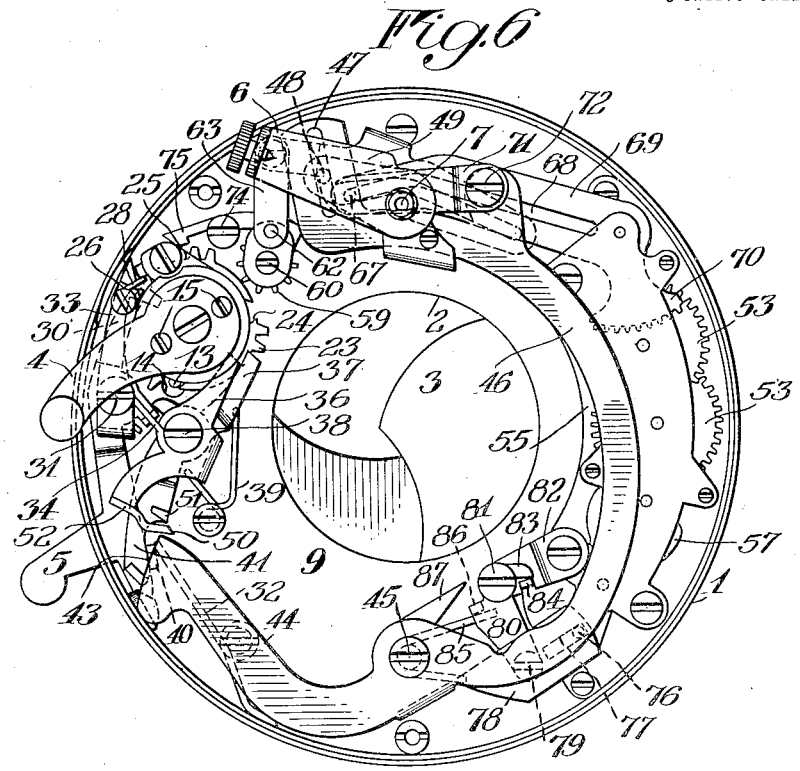
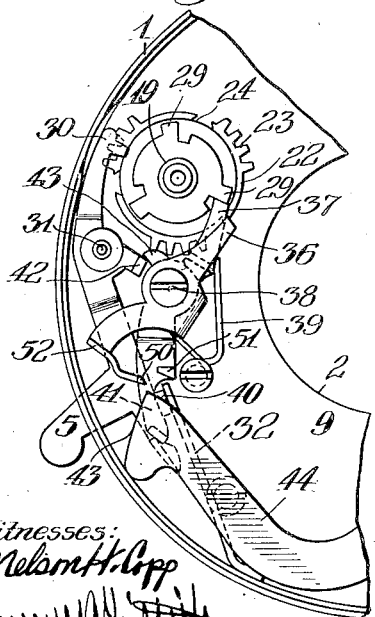
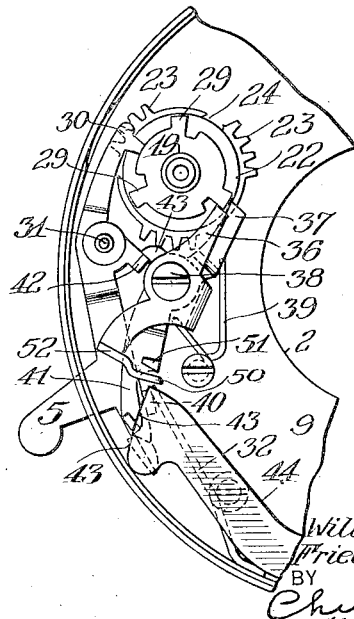

W. A. RIDDELL AND F. A. G. PIRWITZ.
PHOTOGRAPHIC SHUTTER.
APPLICATION FILED JAN. 17, 1919.

1,341,823.

Patented June 1, 1920.
8 SHEETS—SHEET 4.

Witnesses:
Nelson H. Copp

INVENTORS
William A. Riddell
Friedrich A. G. Pirwitz
BY
Church & Rich
their ATTORNEYS W. A. RIDDELL AND F. A. G. PIRWITZ.
PHOTOGRAPHIC SHUTTER.
APPLICATION FILED JAN. 17, 1919.
1,341,823.
Patented June 1, 1920.
8 SHEETS—SHEET 5.
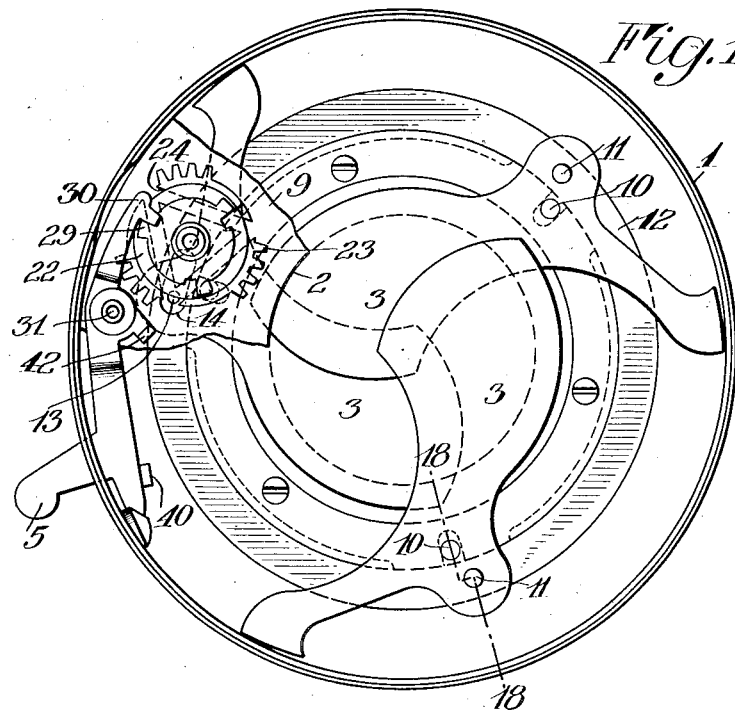
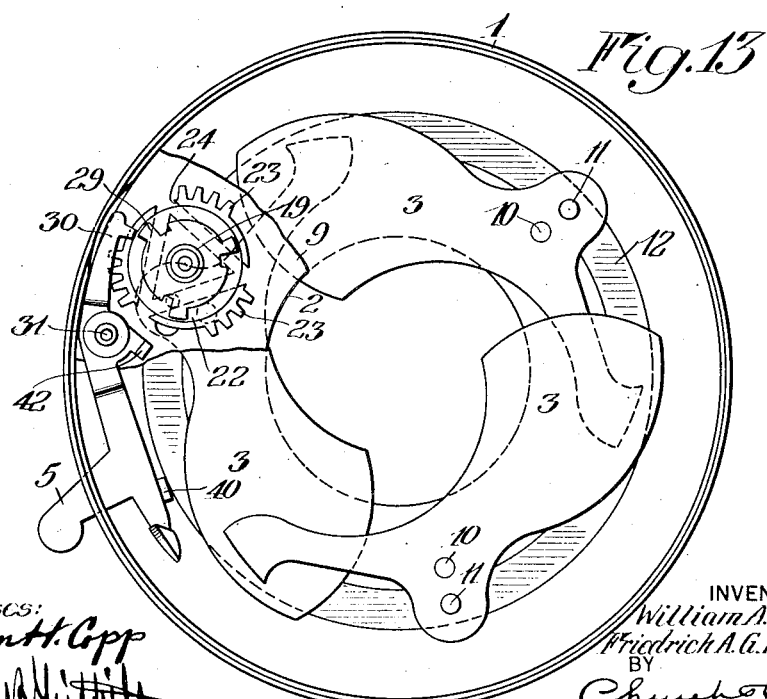

W. A. RIDDELL AND F. A. G. PIRWITZ.
PHOTOGRAPHIC SHUTTER.
APPLICATION FILED JAN. 17, 1919.
1,341,823.
Patented June 1, 1920.
8 SHEETS—SHEET 6.
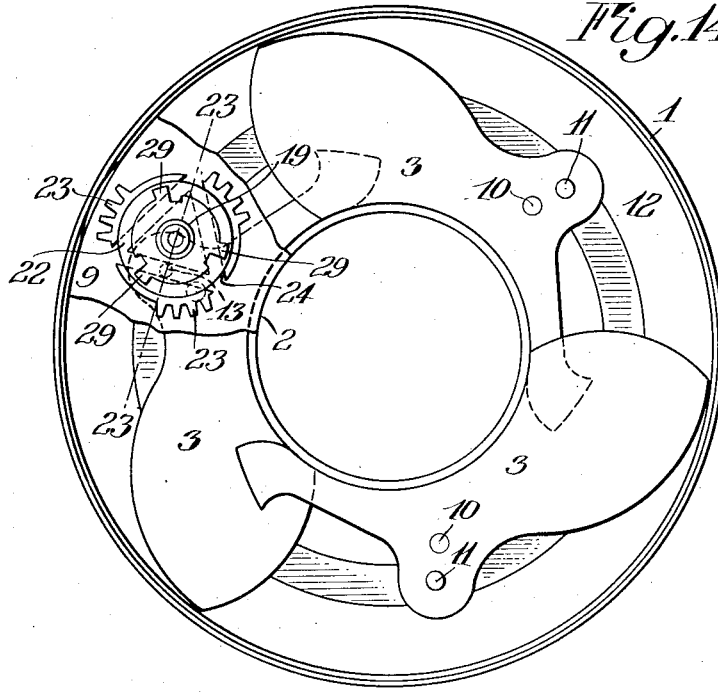
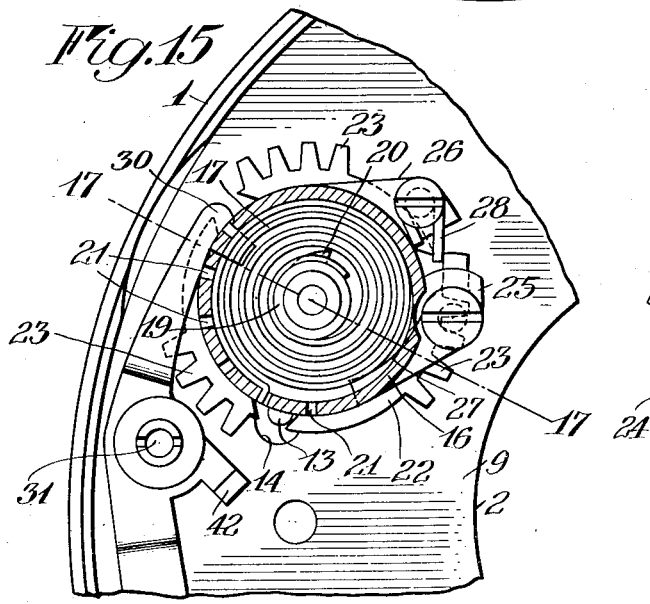
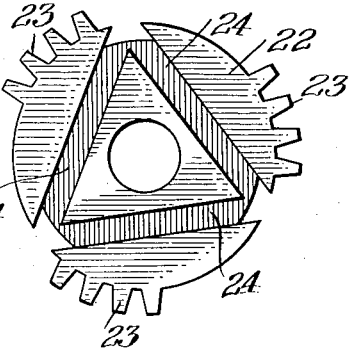
INVENTORS
William A. Riddell
Friedrich A. G. Pirwitz
BY
their ATTORNEYS

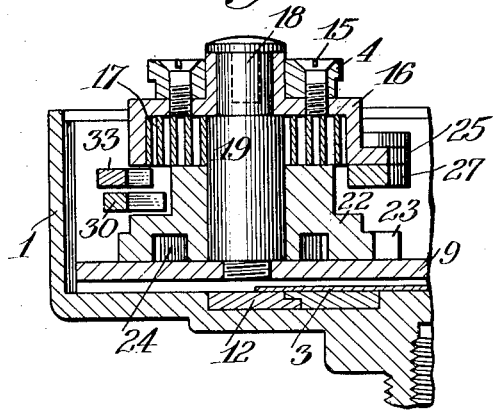
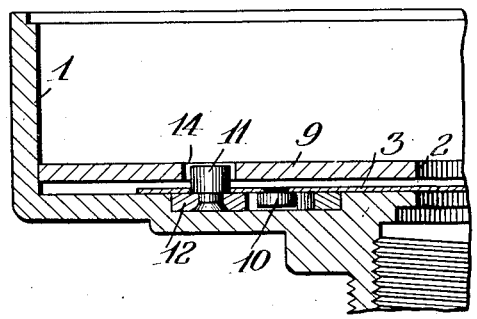
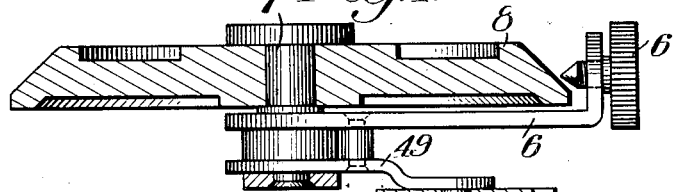
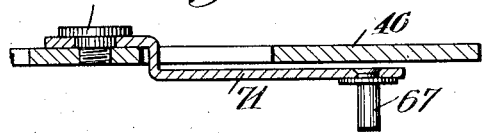
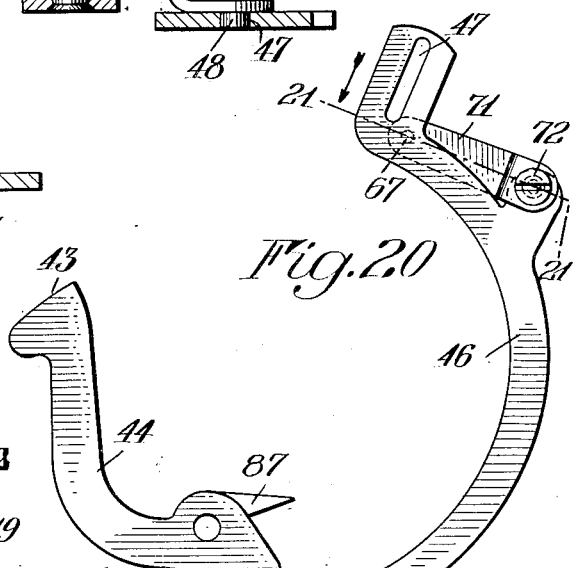
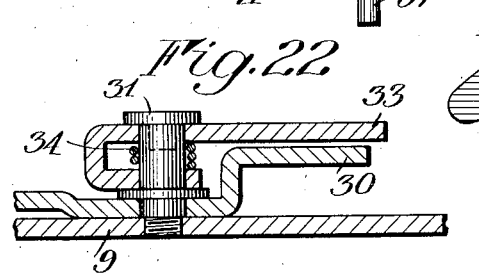
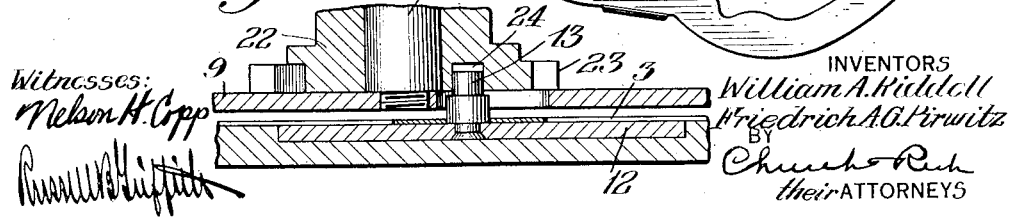

W. A. RIDDELL AND F. A. G. PIRWITZ.
PHOTOGRAPHIC SHUTTER.
APPLICATION FILED JAN. 17, 1919.
1,341,823.
Patented June 1, 1920.
8 SHEETS—SHEET 8.
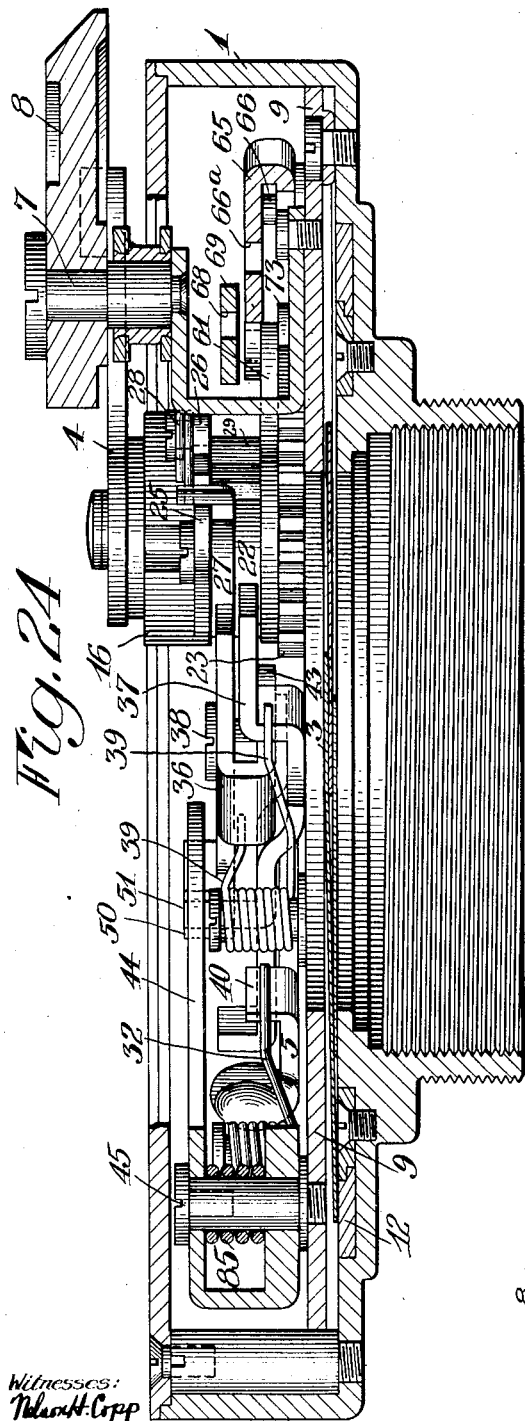
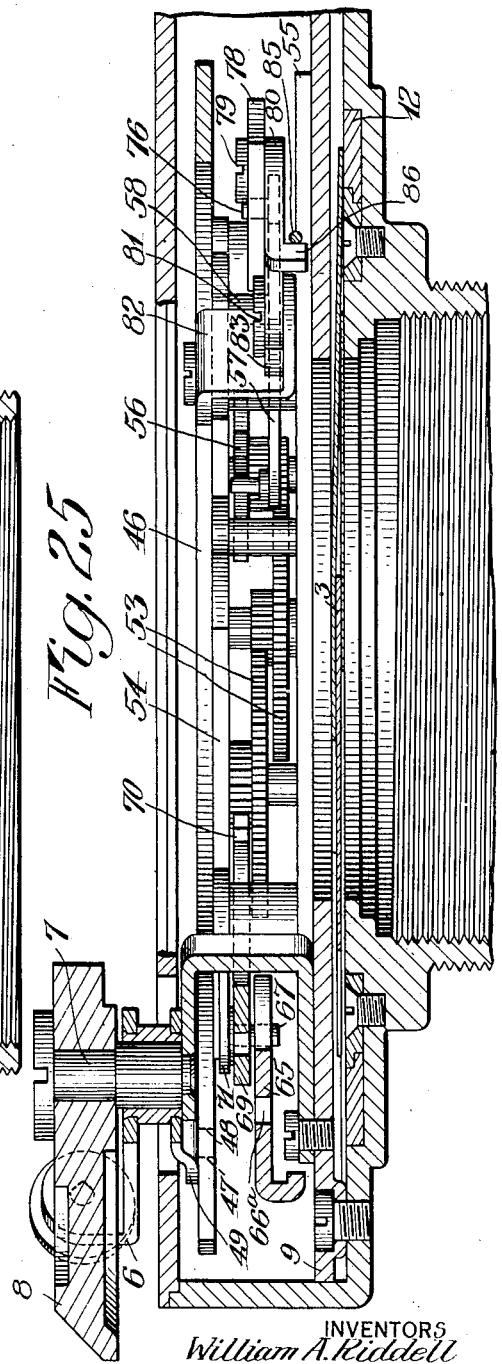
INVENTORS
William A. Riddell
Friedrich A. G. Pirwitz
BY
their ATTORNEYS

UNITED STATES PATENT OFFICE.

WILLIAM A. RIDDELL AND FRIEDRICH A. G. PIRWITZ, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC SHUTTER.

1,341,823.  Specification of Letters Patent.  Patented June 1, 1920.

Application filed January 17, 1919. Serial No. 271,588.

*To all whom it may concern:*

Be it known that we, WILLIAM A. RIDDELL and FRIEDRICH A. G. PIRWITZ, of Rochester, in the county of Monroe and State of New York, have invented certain new and useful Improvements in Photographic Shutters; and we do hereby declare the following to be a full, clear, and exact description of the same, reference being had to the accompanying drawings, forming a part of this specification, and to the reference-numerals marked thereon.

Our present invention relates to photography and more particularly to photographic shutters of the annular, blade type, and it has for its object to provide a simple and accurate shutter mechanism that will be durable in use and will lend itself to processes of manufacture and assembly assuring uniform product. The improvements are directed in part toward the blade actuating mechanism and toward the retarding mechanism whereby the duration of the exposure is timed. To these and other ends the invention resides in certain improvements and combinations of parts all as will be hereinafter fully described, the novel features being pointed out in the claims at the end of the specification.

In the drawings:

In all of the views we have omitted showing the front or cover plate of the shutter and other exterior parts in order to reveal the interior mechanism, the type of shutter and shutter casing of the present embodiment being well known in the art. With this understanding:

Figure 1 is a front view of the shutter with the parts in normal position and the retarding mechanism adjusted for an exposure of maximum duration;

Fig. 2 is a similar but fragmentary view showing the position of certain parts when the shutter is wound or set;

Fig. 3 is another fragmentary view showing the position of the parts at the instant the shutter is released;

Fig. 6 is a front view with the shutter set for time exposure;

Figs. 7 and 8 are fragmentary views showing the open and closed positions, respectively, of a time exposure;

Fig. 9 is a front view showing the shutter wound or set and ready for a bulb exposure;

Figs. 10 and 11 are fragmentary views showing the shutter open on a bulb exposure and closed on a bulb exposure, respectively;

Fig. 12 is a detail front view of the blade mechanism and connected driving parts, the partition member of the shutter being largely broken away to reveal the former;

Fig. 13 is a view similar to Fig. 12 showing the position of the parts during the opening of the blades, as in Fig. 3;

Fig. 14 is another similar view showing the blades open;

Fig. 15 is an enlarged fragmentary view taken in horizontal section through the master member or motor;

Fig. 16 is a bottom plan view, enlarged, of the driving member in detail;

Fig. 17 is a section on the line 17—17 of Fig. 15;

Fig. 18 is an enlarged fragmentary section on the line 18—18 of Fig. 12;

Fig. 19 is an enlarged detail section of the timing indicator taken substantially on the line 19—19 of Fig. 1;

Fig. 20 is a plan view of the time controlling member in detail;

Fig. 21 is an enlarged detail section on line 21—21 of Fig. 20;

Fig. 22 is an enlarged detail section through the pivot of the time stops;

Fig. 23 is an enlarged detail section of the connection between the driving member and the blade actuating ring taken substantially on the line 23—23 of Fig. 14;

Figs. 24 and 25 are enlarged sectional views looking in opposite directions and taken on the line 24—25 of Fig. 1.

Similar reference numerals throughout the several views indicate the same parts.

Figure 4:
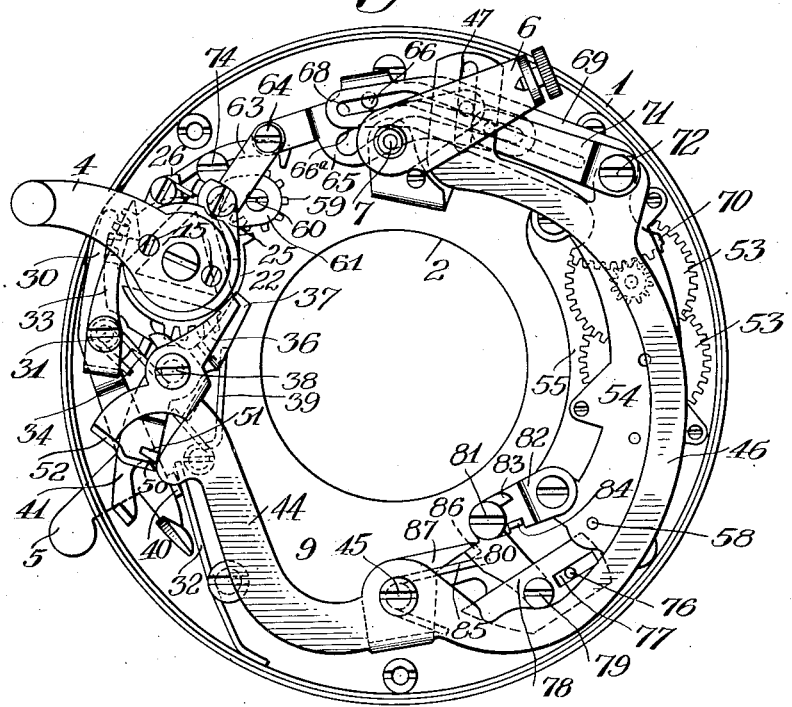
Fig. 4 is a view similar to Fig. 1 but with parts removed, the shutter being open and the mechanism shown working through the retarding device.
Figure 5:
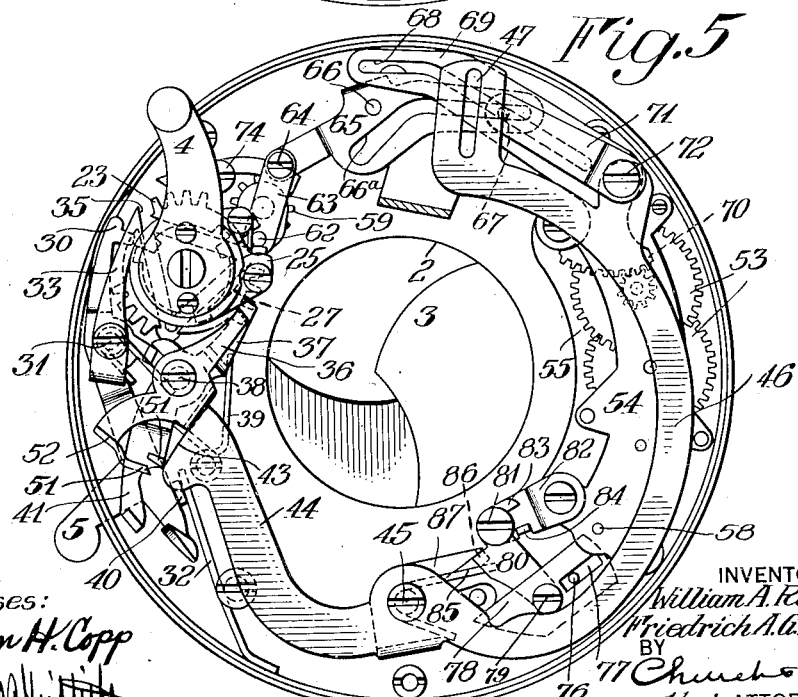
Fig. 5 is a view similar to Fig. 4 with further parts removed and showing the shutter closed again.

The shutter that we have illustrated in the present embodiment of the invention is a set shutter of the pivoted blade symmetrical opening type, though features of the invention are applicable to other types as will appear to those skilled in the art. The usual annular shutter casing is indicated at 1 and embodies a central exposure or lens opening 2 normally closed by the blades 3 (Fig. 1). The spring motor or master member that furnishes the power is wound or set by means of a setting lever 4 as it is moved from the position of Fig. 1 to that of Fig. 2. The shutter is then tripped by the operating lever 5. The timing of the exposure is previously determined by the setting of an indicator lever 6 pivoted at 7 and coöperating with a segmental scale plate 8 which is the only part of the face of the shutter that is shown in the views. On this scale plate are the usual graduations in seconds and fractions thereof and the conventional characters "T" and "B" for time and bulb exposures.

The blade mechanism is not of particular importance as to its details and may be but briefly described. Referring to Figs. 12 and 14 and Figs. 24 and 25, the blades are confined, as usual, between the rear wall of the casing and a partition member 9 upon which latter most of the shutter operating mechanism hereinafter described is carried. Each blade carries a fixed pivot 10 on which it turns in the casing and is engaged by a moving pivot 11 on a blade actuating ring 12 that moves it in unison with the others to symmetrically open and close the lens opening 2. On the ring 12 is also an upwardly projecting pin 13 that operates in a slot 14 in the partition member 9. The oscillation of this pin back and forth causes the rotation of the shutter ring in two directions and the corresponding opening and closing of the blades.

Referring now additionally to Fig. 17, the setting lever 4 is secured by screws 15 to a rotary master member 16 that is in the form of a turret housing for its spring 17 which it incloses and this master member turns on the reduced portion 18 of a stud 19 on the partition 9. The spring 17 is a clock or flat spiral spring, the inner end of which is hooked onto a lateral lug 20 on the stud 19, as shown in Fig. 15, while the outer end is hooked into one or the other of several notches or slots 21 on the periphery of the master member, accordingly as its tension is desired to be strong or weak. Below the master member there also rotates on the stud 19 a driving member 22 having the form of an interrupted gear, separated segments of which are indicated at 23. On the under side of this driving member is a triangular cam track 24, best shown in Fig. 16. The pin 13 on the shutter ring 12 coöperates with this cam track in the manner shown in dotted lines in Figs. 12, 13 and 14 and in section in Fig. 23. The pin normally lies in one angle of the track and it will be seen from an inspection of the three figures mentioned, that for each one-third revolution of the master member, the blades will be opened and closed, the pin passing from the position of Fig. 12 to that of Fig. 13 during the opening, reaching the position of Fig. 14 when the blades are open, and then reassuming the relative position of Fig. 12 as the blades are closed again. It will be further observed that in the position of Fig. 12, the blades are locked closed against being jarred open because the pin is opposite and blocked by the point of the cam.

On the master member 16 are two lateral lugs 25 and 26 on the under side of the first of which (Figs. 6 and 17) is pivoted a pawl 27 while its actuating spring 28 is mounted on the other. This pawl engages the hub of the actuating member 22 on the periphery of which are formed three stop lugs 29 (see also Fig. 15) that also act as ratchet lugs with reference to this pawl which is always in engagement with one of them and transmits the tension of the spring 17 to the driving member 22. In setting the shutter, the setting lever 4 is moved to the left which causes the pawl 27 to engage behind the next succeeding lug 29, as shown in Fig. 6, the spring 17 being wound up or contracted. The tension on the driving member 22 is resisted by a latch 30 on an extension of the shutter operating lever 5 pivoted at 31 and normally held in engaging position by the spring 32, and this latch also coöperates with the lugs 29, as clearly shown in Fig. 12. Working with the latch 30 and mounted on the same pivot 31 is a stop latch 33, best shown in Fig. 11, which is urged toward engaging position by a spring 34 and which also coöperates with the lugs 29 of the driving member. This latch has a cam face 35 and when the shutter is set, the butt of the pawl 27 of the driving member engages this cam face and throws out the pawl 33 so that the driving member 22 is restrained only by the latch 30 of the shutter operating lever 5. When the latter is released to operate the shutter, the driving member 22 rotates through a third of a revolution or until the stop latch 33 engages the next succeeding lug 29. Therefore, in the winding of the shutter, the master member 16 is carried back one-third of a revolution and upon the release of the shutter for a complete operation thereof, the driving member 22 is carried ahead a third of a revolution. This carries the pin 13 of the blade ring 12 around one angle of the triangular cam track 24 on the driving member and opens and then closes the blades. It will be noted that the intermittent movements communicated to the driving member 22 by the master member 16 rotate it in one direction only.

Referring now to Figs. 6 to 11, the usual time and bulb stops 36 and 37 pivoted at 38 are employed and they also coöperate with the stop lugs 29 of the driving member 22 (see also Fig. 24.) A spring 39 having a bearing against each tends to move them into engagement but the spring 32 of the operating lever 5 is stronger and when the operating lever is in normal position, a lug 40 thereon engages an arm 41 on the bulb lever 37 and holds it out, as shown in Fig. 1. The time lever 36 is also normally held out by the engagement of the pawl 27 of the master member. During a time exposure (Fig. 7) the releasing movement of the shutter operating lever 5 allows the bulb stop 37 to go into engagement with the first lug 29 and halt the driving member with the blades open. As the operator withdraws pressure from the operating lever 5, it throws out this bulb stop by the contact at 40—41 as described, but the time stop 36 immediately goes into engagement under the influence of the spring 39, all as shown in Fig. 8. The next actuation of the operating lever 5 throws out the time stop by the engagement of an arm 42 on the former with an arm 43 on the latter and the driving member is allowed to complete its movement and close the blades.

Both the time and bulb levers must be free to act for the foregoing operations. To effect the bulb exposure, the time stop 36 must be restrained and this is accomplished by means of a stop surface 43 on one arm 44 of a controlling lever pivoted at 45. The other arm 46 of this lever has a slotted portion 47 at its extremity and engaging in this slot is a pin 48 on a lower arm 49 of the timing indicator lever 6, earlier referred to as being pivoted at 7 to coöperate with the dial 8. The construction of this lever is shown in detail in Fig. 19. It is at the extreme left at the reading "T" for the time exposure described and when a bulb exposure is desired, it is moved slightly to the right to the reading "B" which throws the controller (shown in detail in Fig. 20), to the right as in Fig. 9, in a position to block a lug 50 on the time stop 36, but not the lug 51 on the bulb stop 37. Therefore, when the operating lever 5 is tripped, the driving member 22 is stopped by the bulb lever 37 with the blades open, as shown in Fig. 10 but with the release of the operating lever, the time stop 36 cannot go into engaging position. As such release of the operating lever throws out the bulb stop 37 by the contact at 40—41, the driving member resumes its travel and immediately closes the blades again, as shown in Fig. 10. With any further movement of the adjusting lever 6 to the right to the fractional second readings, the surface 40 on the controlling lever 44 blocks both the time and bulb stops and holds them permanently out, the time stop 36 being provided with a lug 52 for this purpose as shown in Fig. 4, for instance, where the adjustment is for an automatically timed exposure of the maximum duration of one second.

The period of an automatically timed exposure is regulated by means of a retarding device that slows the action of the driving member 22. In the present instance, this retarding device embodies (Fig. 1) a gear train 53 held in bearing plates 54 and 55 and terminating in an escapement device including a star wheel 56 and a vibratory anchor 57 pivoted at 58 and to be later referred to. Motion is transmitted to the retarding device by the interrupted gear segments 23 of the driving member 22 which mesh intermittently with a pinion 59 turning on a stud 60. Fixed to this pinion is an eccentric plate 61 carrying a crank pin 62 with which connects a pitman 63 pivoted at 64 to a lever 65 turning on a fixed pivot 66. This lever 65 is provided with a longitudinal slot 66ª (Fig. 3) to adjustably receive a fulcrum pin 67 (see also Fig. 11) that also passes through a similar slot 68 in a segment lever 69. The segment 70 of this lever (Fig. 1) is in constant mesh with the gear train 53. It will be seen therefore that upon each half rotation of the pinion 59 the gear train will be driven in either one direction or the other except when the fulcrum pin 67 is at the extreme outer end of the segment lever slot 68 and the corresponding end of the slot 66, which end portion of the last mentioned slot is widened to give the fulcrum pin a sufficient lost motion to allow it to communicate such a slight motion to the segment lever 69 and with such a long leverage that the movement thereof is negligible if it moves at all.

Such an adjustment of the fulcrum pin 67 is made during time and bulb exposures, as shown in Figs. 6 to 11 by reason of the fact that the fulcrum pin 67 is carried on a link 71 (Figs. 1 and 21) pivoted at 72 to the controller lever 46. When the latter is adjusted to carry its stop surface 43 out of the paths of the time and bulb stops it automatically throws out the retarding device through the movement of the adjustable fulcrum in this manner. As the indicator lever 6 is moved to the right and the controller is correspondingly adjusted, an automatically timed exposure of increasing duration results because the fulcrum pin 67 travels down the slots 66ª and 68 to give a constantly decreasing leverage of the lever 65 upon the segment lever 69 and hence a constantly increasing throw of the latter to be communicated to the gear train 53.

As shown in Fig. 1, the pinion 59 is normally in mesh with no gear segment 23 of the driving member 22 but is between two such segments, and at such times the pinion is engaged by the toothed arm 73 of a locking pawl 74. A cam surface 75 on the other arm of the pawl is at that time riding on one of the gear segments 23 of the driving member 22 to hold the pawl in locking position. This position of the pinion is, of course, not changed during the movement of the setting lever 4 which winds the master member 16, as shown in Fig. 2. When the shutter is operated and the driving member released, the nearest gear segment 23 travels a distance before it goes into mesh with the pinion 59. During this movement, the driving member opens the shutter blades, a rapid opening of the blades unhampered by the retarding devices being desirable. As soon as the shutter is opened, however, the said segment goes into mesh with the pinion 59, as shown in Fig. 3, and the segment is long enough to give the pinion a half revolution before the driving member is arrested by the stop pawl 33, the pinion freeing itself of the locking pawl 73 as the segment no longer holds the latter in engagement. This half rotation of the pinion carries the pitman 63 across the center and gives a full throw to the lever 65 and hence to the gear train. The crank pin 62 is normally on a dead center with reference to the pitman 63 and it moves from dead center to dead center at each actuation of the driving member 22. This not only gives the same movement to the segment lever 69 in each direction, one movement of the gearing being utilized for one exposure and the reverse movement for the next, but it will be observed that the movement of the pitman and crank is slight at first, gradually increasing, so that the retarding force is brought in gradually and applies itself smoothly and without strain or jar, giving uniform and more desirable action to the shutter as a whole.

The action of the retarding device is additionally modified in another way. Referring to Figs. 1 and 9, the anchor 57 of the escapement device carries a pin 76 that takes into a slot 77 in an oscillatory weight 78 pivoted at 79 to a swinging arm 80. This arm is pivoted at 81 to a bracket 82 and it has a finger 83 that is normally in engagement with a stop 84 on the bracket through the influence of a spring 85 mounted on the pivot 45 of the controller and engaging a downwardly extending lug 86 on the arm 80, as shown in Fig. 9. This gives the anchor 57 the maximum leverage against the weight in vibrating it, the fulcrum pin 76 then being at the outer end of the slot 77 and hence the additional retarding action of the weight is reduced. Such is the adjustment when the controller 44 is set for time or bulb exposure and it is substantially so as the controller is moved on to the faster automatically timed exposures. When, however, the indicator arm 6 and hence the controller are thrown farther to the right to give a greater swing to the gear train and make longer exposures, a finger 87 on the controller 44 engages the lug 86 on the arm 80 in opposition to the spring 85 and swings the arm 80 so that the pivot 79 of the weight is carried closer to the fulcrum pin 76. This reduces the leverage of the anchor 57 and increases the resistance so that by the time the gear train operating segment 70 is working with its full swing, the full retarding action of the weight 78 is also being applied to the escapement device at the opposite end of the train and in this way, the ability to increase the retarding action is limited only by the weight that can be applied at 78 and the amplitude of its adjustment.

We claim as our invention:

1. In a photographic shutter, the combination with a blade mechanism and a spring actuated master member, of a driving member for the blade mechanism actuated intermittently in one direction by the master member.

2. In a photographic shutter, the combination with a blade mechanism, a spring actuated master member and a driving member for the blade mechanism actuated intermittently in one direction by the master member, of a shutter operating member, a detent controlled thereby and adapted to restrain the driving member when the master member is set and a second detent for halting the driving member after each actuation thereof.

3. In a photographic shutter, the combination with a blade mechanism, a spring actuated master member and a driving member for the blade mechanism actuated intermittently in one direction by the master member, of a detent normally restraining the driving member but disengaged temporarily by the setting of the master member and a second detent for restraining the driving member while the master member is set.

4. In a photographic shutter, the combination with a blade mechanism, a spring actuated master member and a driving member for the blade mechanism actuated intermittently in one direction by the master member, of a shutter operating member, a detent normally restraining the driving member but disengaged by the setting of the master member, and a second detent on the shutter operating member for restraining the driving member while the master member is set.

5. In a photographic shutter, the combination with blade mechanism and a driving member therefor adapted to rotate intermittently in one direction, and having abutments on its periphery, of a spring actuated rotary master member overlying the driving member concentrically therewith and having a lateral lug and a pawl pivoted on the underside of said lug and coöperating with the abutments on the driving member.

6. In a photographic shutter, the combination with a blade mechanism including blades and an actuating ring having a projection thereon, of a rotary driving member having an angular cam track coöperating with the projection on the ring to move the latter in two directions.

7. In a photographic shutter, the combination with a blade mechanism including blades and an actuating ring having a projection thereon, of a rotary driving member having a triangular cam track coöperating with the projection of the ring to move the latter in two directions.

8. In a photographic shutter, the combination with a blade mechanism including blades and an actuating ring having a projection thereon, of a rotary driving member having a continuous triangular cam track coöperating with the projection on the ring, and a master member adapted to actuate the driving member intermittently in one direction to successively open and close the blades.

9. In a photographic shutter, the combination with a blade mechanism including blades and an actuating ring therefor having a projection thereon, of a rotary driving member overlying the ring and having a continuous triangular cam track on its under side coöperating with the projection on the ring, a spring actuated rotary master member overlying the driving member, and a pawl on the master member coöperating with the driving member to rotate it intermittently in one direction.

10. In a photographic shutter, the combination with a blade mechanism including blades and an actuating ring therefor having a projection thereon, of a rotary driving member having a continuous triangular cam track coöperating with the projection on the ring, a master member adapted to actuate the driving member intermittently in one direction, a retarding device embodying a gear train and a crank for imparting motion from the driving member to the retarding device.

11. In a photographic shutter, the combination with blade mechanism and a driving member therefor, of a retarding device having a retarding movement in two directions and a crank for imparting movement from the driving member to the retarding device.

12. In a photographic shutter, the combination with blade mechanism and a driving member therefor, of a retarding device comprising a gear train having a retarding movement in two directions, and a crank for imparting movement from the driving member to the train.

13. In a photographic shutter, the combination with blade mechanism and a driving member therefor, of a retarding device having a retarding movement in two directions, and a crank movable from one dead center to the other upon each actuation of the driving member and connected to the retarding device.

14. In a photographic shutter, the combination with a blade mechanism and a driving member therefor, of a retarding device having a retarding movement in two directions and embodying a gear train and a segment arm, a rotary element intermittently driven by the driving element and having a crank pin thereon and a link connecting the crank pin and segment arm.

15. In a photographic shutter, the combination with a blade mechanism and a driving member therefor, of a gear train having a retarding action in two directions, a segment arm meshing therewith, and a crank movable from one dead center to the other upon each actuation of the driving member and connected to the segment arm.

16. In a photographic shutter, the combination with a blade mechanism, a driving member therefor and a spring actuated master member for actuating the driving member intermittently in one direction, of a retarding device having retarding action in two directions, and a crank rotated by the driving member and connected to the retarding device.

17. In a photographic shutter, the combination with a blade mechanism and a retarding mechanism having a retarding action in two directions, of a driving member for the blade mechanism, a crank adapted to communicate motion therefrom to the retarding mechanism, and means for halting the driving member after each actuation of the shutter with the crank on a dead center.

18. In a photographic shutter, the combination with a blade mechanism and a retarding device, of a driving member embodying ar interrupted gear, a master member for rotating the driving member intermittently in one direction and a pinion meshing intermittently with the driving member and having a crank pin thereon connecting it with the retarding device.

19. In a photographic shutter, the combination with a blade mechanism and a gear train constituting a retarding device having a retarding action in two directions, of a driving member embodying an interrupted gear, a master member for rotating the driving member intermittently in one direction and a pinion meshing intermittently with the driving member and having a crank pin thereon connecting it with the retarding device.

20. In a photographic shutter, the combination with a blade mechanism and a gear train and segment lever constituting a retarding device having a retarding action in two directions, of a driving member embodying an interrupted gear, a master member for rotating the driving member intermittently in one direction, a pinion meshing intermittently with the driving member and having a crank pin thereon, and a crank rod for communicating motion from the crank pin to the segment lever.

21. In a photographic shutter, the combination with a blade mechanism and a retarding device having retarding action in two directions, of a driving member embodying an interrupted gear, a master member for rotating the driving member intermittently in one direction, a pinion meshing intermittently with the driving member, and having a crank pin thereon connecting it with the retarding device, and means for halting the driving member after each actuation of the shutter with the crank on a dead center.

22. In a photographic shutter, the combination with a blade mechanism embodying an actuating ring having a projection thereon, and a retarding device having a retarding action in two directions, of a driving member embodying an interrupted gear having a triangular cam track coöperating with the projection on the blade ring, a pinion driven intermittently by the driving member and having a crank pin connecting it to the retarding device, a master member adapted to rotate the driving member intermittently in one direction, and means for halting the driving member after each actuation of the shutter with the crank pin on a dead center.

23. In a photographic shutter, the combination with a blade mechanism embodying an actuating ring having a projection thereon, and a retarding device having a retarding action in two directions, of a driving member embodying an interrupted gear having a triangular cam track coöperating with the projection on the blade ring, and means including a crank and pinion for communicating intermittent motion from the driving member to the retarding device.

24. In a photographic shutter, the combination with a blade mechanism embodying an actuating ring having a projection thereon, and a retarding device, of a driving member embodying an interrupted gear having a triangular cam track coöperating with the projection on the blade ring, and means including a crank and pinion for communicating intermittent motion from the driving member to the retarding device.

25. In a photographic shutter, the combination with a blade mechanism and a retarding device, of a driving member for the blade mechanism embodying an interrupted gear, means including a pinion driven by the interrupted gear for communicating motion to the retarding device and a master member adapted to rotate the driving member intermittently in one direction.

26. In a photographic shutter, the combination with a blade mechanism and a driving member therefor embodying an interrupted gear, of a retarding device, means including a crank and pinion for communicating intermittent motion from the driving member to the retarding device, and a locking device actuated by the driving member and coöperating with the pinion to lock the retarding device between impulses from the driving member.

27. In a photographic shutter, the combination with a blade mechanism and a driving member therefor embodying an interrupted gear, of a retarding device, means including a crank and pinion for communicating intermittent motion from the driving member to the retarding device, and a pawl having one arm coöperating with and actuated by the gear segments on the driving member and the other arm toothed to engage the pinion to lock the retarding device between impulses from the driving member.

28. In a photographic shutter, the combination with blade mechanism, and a driving member for actuating the same, of a retarding device embodying a gear train having a vibrating escapement arm, a vibratory pivoted member actuated by the escapement arm and means for adjusting the point of leverage between said vibratory members.

29. In a photographic shutter, the combination with blade mechanism, and a driving member for actuating the same, of a retarding device embodying a gear train having a vibratory escapement arm, a vibratory pivoted member having a slot and pin connection with the escapement arm and means for shifting the position of the pivoted member to adjust the point of leverage between it and the escapement arm.

30. In a photographic shutter, the combination with blade mechanism, and a driving member for actuating the same, of a retarding device embodying a gear train having a vibrating escapement arm, a controlling member for regulating the driving connection between the driving member and the retarding device, and a vibratory pivoted member actuated by the escapement arm and movable under the influence of the controlling member to adjust the point of leverage between it and the escapement arm.

31. In a photographic shutter, the combination with a blade mechanism, a retarding device and a driving member adapted to transmit motion to both, of a retarding element for regulating the action of the retarding device and a common controlling member for said retarding element and for the driving connection between the retarding device and the driving member.

32. In a photographic shutter, the combination with a blade mechanism, a retarding device embodying a vibratory member, and a driving member operatively connected to both, of a pivoted weight adapted to be oscillated by the vibratory member and means for shifting the point of fulcrum between the latter and the weight.

33. In a photographic shutter, the combination with a blade mechanism, a retarding device embodying a vibratory member, and a driving member operatively connected to both, of a pivoted weight adapted to be oscillated by the vibratory member, and means for moving the pivotal center of the weight to shift the point of fulcrum between the latter and the vibratory member.

34. In a photographic shutter, the combination with a blade mechanism, a retarding device embodying a vibratory member, and a driving member operatively connected to both, of a swinging arm, a weight pivoted thereto and adapted to be oscillated by the vibratory member, and means for adjusting the swinging arm to shift the point of fulcrum between the vibratory member and the weight.

35. In a photographic shutter, the combination with a blade mechanism a variable retarding device embodying a vibratory member, and a driving member operatively connected to both, of a pivoted weight adapted to be oscillated by the vibratory member and a common controlling device for the retarding device and for shifting the point of fulcrum between the vibratory member and the weight.

36. In a photographic shutter, the combination with a blade mechanism, a retarding device embodying a vibratory member, a driving member operatively connected to both, and time and bulb stops for the driving member, of a pivoted weight adapted to be oscillated by the vibratory member and a common controlling device for the time and bulb stops and for shifting the point of fulcrum between the vibratory member and the weight.

37. In a photographic shutter, the combination with a blade mechanism, a variable retarding device embodying a vibratory member, a driving member operatively connected to both, and time and bulb stops for the driving member, of a pivoted weight adapted to be oscillated by the vibratory member and a common controlling device for the time and bulb stops, the retarding device, and for shifting the point of fulcrum between the vibratory member and the weight.

38. In a photographic shutter, the combination with a blade mechanism and a driving member therefor, of an escapement operated by the driving member and embodying a vibratory member, a pivoted weight oscillated by the vibratory member, and means for shifting the point of fulcrum between the latter and the weight.

WILLIAM A. RIDDELL.
FRIEDRICH A. G. PIRWITZ.